United States Patent [19]

Harden et al.

[11] Patent Number: 5,076,223
[45] Date of Patent: Dec. 31, 1991

[54] MINIATURE RAILGUN ENGINE IGNITOR

[75] Inventors: Brian L. Harden, Norman, Okla.; Ronald D. Matthews, Austin; Steven P. Nichols, Austin, Tex.; William F. Weldon, Austin, Tex.

[73] Assignee: Board of Regents, The University of Texas System, Austin, Tex.

[21] Appl. No.: 502,264

[22] Filed: Mar. 30, 1990

[51] Int. Cl.$^5$ .................. F02P 1/00; F02P 23/00; H01T 13/20
[52] U.S. Cl. ................. 123/143 B; 313/143
[58] Field of Search ...... 123/143 B, 169 EL, 169 EB, 123/169 EC, 149 A, 620; 313/141, 142, 143, 231.41

[56] References Cited

U.S. PATENT DOCUMENTS

| | | | |
|---|---|---|---|
| Re. 32,505 | 9/1987 | Hensley et al. | 361/257 |
| 1,307,088 | 6/1919 | Drummond . | |
| 2,833,265 | 5/1958 | Hindle et al. | 123/661 |
| 2,864,974 | 12/1958 | Smits . | |
| 2,879,451 | 3/1959 | Sherwood . | |
| 2,894,161 | 7/1959 | Sheheen . | |
| 3,032,683 | 5/1962 | Ruckelshaus . | |
| 3,219,866 | 11/1965 | Dingman | 313/118 |
| 3,515,937 | 6/1970 | Collins . | |
| 3,551,738 | 12/1970 | Young . | |
| 3,723,809 | 3/1973 | Fujii | 123/149 A X |
| 3,842,819 | 10/1974 | Atkins et al. | 123/169 MG |
| 3,896,322 | 7/1975 | Sawada et al. | 313/142 |
| 3,911,307 | 10/1975 | Goto et al. | 313/143 |
| 3,921,605 | 11/1975 | Wyczalek | 123/143 B |
| 3,958,144 | 5/1976 | Franks | 313/143 X |
| 4,041,922 | 8/1977 | Abe et al. . | |
| 4,071,800 | 1/1978 | Atkins | 313/123 |
| 4,122,816 | 10/1978 | Fitzgerald et al. . | |
| 4,200,831 | 4/1980 | Weldon et al. | 322/8 |
| 4,203,393 | 5/1980 | Giardini et al. . | |
| 4,333,125 | 6/1982 | Hensley et al. | 361/257 |
| 4,398,526 | 8/1983 | Hamai et al. | 123/606 |
| 4,402,036 | 8/1983 | Hensley et al. | 313/143 X |
| 4,471,732 | 9/1984 | Tozzi | 123/143 B |
| 4,487,192 | 12/1984 | Anderson et al. | 123/654 |
| 4,493,297 | 1/1985 | McIlwain et al. | 123/143 B |
| 4,510,915 | 4/1985 | Ishikawa et al. | 123/620 |
| 4,546,740 | 10/1985 | Clements et al. | 123/143 B X |
| 4,760,820 | 8/1988 | Tozzi | 123/145 B |
| 4,766,855 | 8/1980 | Tozzi | 123/143 B |

FOREIGN PATENT DOCUMENTS

| | | | |
|---|---|---|---|
| 3821688 | 1/1990 | Fed. Rep. of Germany . | |
| 2253297 | 6/1975 | France . | |
| 2347803 | 11/1977 | France . | |
| 0054818 | 5/1977 | Japan | 123/143 B |
| 0156264 | 12/1980 | Japan | 123/143 B |
| 2043773 | 10/1980 | United Kingdom . | |
| 2086986 | 5/1982 | United Kingdom . | |
| 2199075 | 6/1988 | United Kingdom . | |

OTHER PUBLICATIONS

Fitzgerald, "Pulsed Plasma Ignitor for Internal Combustion Engines", Jet Propulsion Laboratory, California Institute of Technology, Society of Automotive Engineers (Oct. 1976) pp. 1-6.

Cetegen, B. et al., "Performance of a Plasma Jet Ignitor", Society of Automotive Engineers, Inc. (Feb. 1980) pp. 1-14.

Oppenheimer, A. K. et al., "Jet Ignition of an Ultra-Lean Mixture", Society of Automotive Engineers pp. 2416-2428, (1-1979).

Clements, R. M. et al., "An Experimental Studey of the Ejection Mechanism for Typical Plasma Jet Ignitors", Combustion and Flame, 42:287-295 (1-1981).

(List continued on next page.)

Primary Examiner—Willis R. Wolfe
Attorney, Agent, or Firm—Arnold, White Durkee

[57] ABSTRACT

A plasma ignitor system capable of injection a narrowly focused high energy plasma jet into a combustion chamber of an internal combustion engine or continuous combustion system. The plasma ignitor features a high energy current pulse source and a geometrically configured coaxial or dual-rail ignitor system for deeper and more accurate injection of plasma into a combustion chamber of either large or small dimension.

40 Claims, 4 Drawing Sheets

OTHER PUBLICATIONS

Orrin, J. E. et al., "Ignition by Radiation from Plasma", Combustion and Flame, 37:91-93 (1-1980).

Asik, J. R. et al., "Design of a Plasma Jet Ignition System for Automotive Application", Society of Automotive Engineers pp. 1516-1530, (1-1978).

Weinberg, F. et al., "Ignition by Plasma Jet", Nature 272:341-343 (Mar. 23, 1978).

Topham, D. R. et al., "An Investigation of a Coaxial Spark Ignitor with Emphasis on its Practical Use", (3-1975).

Dale, J. et al., "The Effects of a Coaxial Spark Ignitor on the Performance of and the Emissions from an Internal Combustion Engine", Combustion and Flame, 31:173-185 (1-1978).

MINIATURE RAILGUN ENGINE IGNITOR

BACKGROUND OF THE INVENTION

The invention relates to a method and apparatus for managing the penetration of high energy, high velocity plasma into a combustion chamber of an internal combustion engine or a continuous combustion system.

With the need both to conserve fuel and to protect the environment, new methods are sought to increase the efficiency of conventional internal combustion engines or continuous combustion systems. One method is to operate the engine at a much leaner fuel-to-air mixture. This will reduce the fuel requirements while also lowering the amounts of pollutants emitted into the air. Although using leaner mixtures seems an obvious solution, various problems arise in developing lean-burning engines. One problem is that leaner mixtures do not reliably ignite with conventional electrical spark mechanisms. In order to ignite the leaner mixtures, a much hotter electrical energy source is required. Thus, researchers have turned to high energy plasma jet ignitors as a means for providing the necessary higher ignition temperature for lean-burn engines.

In addition, ignition does not guarantee effective combustion of the fuel-air mixture. Lean mixtures have a much lower unstretched laminar flame speed (a thermochemical property) than the stoichiometric to slightly rich mixtures commonly used. This slow burning results in decreased thermal efficiency of the engine and a consequent increase in fuel consumption. Further, lean mixtures have a low energy release rate per unit volume of combustible mixture. If the ignition source is located adjacent to the relatively cool combustion chamber walls, as with a conventional spark plug, the rate of heat loss to the walls can be greater than the energy liberation rate due to combustion, thus leading to flame quench, incomplete combustion, increased fuel consumption, and increased hydrocarbon emissions. Further, as the mixture becomes increasingly lean, misfire and partial burn limits are encountered. Eventually the lean operating limit is encountered. The net result is that, as the mixture becomes progressively leaner, the hydrocarbon emissions begin to increase rather than decrease as expected.

The "partial burn limit" is a result of flame stretch extinguishing the flame during early flame development. The unconsumed fuel, in the region of the combustion chamber through which the flame has not passed, appears in the exhaust as unburned hydrocarbons. The "lean operating limit" is defined as the mixture for which the coefficient of variation of the indicated mean effective pressure becomes excessive or, in other words, the cyclic variability is sufficiently severe that the engine operates erratically. This is most important at idle. This cyclic variability is due to three factors: misfire on some cycles, partial burn on other cycles, and on the remaining cycles, variation of the rate of combustion during the early stages of combustion. The variation of the initial rate of combustion has been shown to be due to differences in the direction of migration of the initial spark kernel, which is being pushed around by relatively larger turbulent eddies. Thus, it has been argued that cyclic variations cannot be established once the flame kernel is larger than a critical size.

One solution to these problems is to ignite the mixture on a larger (global) scale instead of at a point. This reduces the distance the flame must propagate and minimizes flame quench. Further, the ignitor should induce turbulence in the combustion chamber. This increases the burning rate. One method proposed for achieving global ignition and inducing turbulence is the use of plasma jet ignitors for leanburn engines.

Many types of plasma jet ignitors have been proposed. The earliest was originally developed in Russia and is disclosed in U.S. Pat. No. 4,041,922. This type of plasma jet ignitor is also known as a torch cell or torch ignitor and uses a prechamber separated from the main combustion chamber by an orifice. An essentially conventional spark plug is located in the prechamber. When the spark jumps the spark plug gap, a very small amount of plasma is formed in the arc. This provides the energy to ignite the combustible mixture in the prechamber. The orifice serves to pressurize the reacting mixture until a jet of reactive species issues from the prechamber and into the main combustion chamber, thereby serving to ignite the lean mixture in the main combustion chamber. Because a conventional spark plug is used in the prechamber, an essentially stoichiometric or rich mixture must be present in the prechamber but the mixture in the main chamber can be sufficiently lean that the overall mixture is lean. Thus, this device achieves an ignition jet solely through thermal expansion of the combustible mixture in the prechamber and the jet mixture is relatively cool. The jet velocity is much less than the velocity of sound and the jet temperature and velocity decline as the jet expands.

Another type of plasma jet ignitor is described in U.S. Pat. No. 3,911,307. It is similar to a conventional spark plug but embodies a recessed center electrode and an orifice cap over the cavity formed by recessing the center electrode. The orifice cap serves as the ground electrode. When an arc jumps between the center electrode and the ground electrode, the gases within the arc become ionized. The remaining gases in the cavity are thermally heated by heat transfer from the ionized gases. The orifice serves to pressurize these gases until a jet of reactive species issues from the cavity and into the combustion chamber, thereby serving to ignite the lean mixture in the combustion chamber. Thus, this device achieves an ignition jet solely through thermal expansion of the gases in the cavity and the jet mixture is relatively cool. The jet velocity is limited to the velocity of sound. Also, the jet temperature and velocity decline as the jet expands.

Another type of plasma jet ignitor is described in U.S. Pat. No. 4,122,816. This plasma jet ignitor also has a cavity and an orifice which separates the cavity from the combustion chamber. The orifice is an annulus surrounding the center electrode. The ground electrode surrounds the external portion of the orifice. When an arc jumps the gap across the orifice, the gases within the arc become ionized. The gases within the cavity are thermally heated by heat transfer from the ionized gases. The orifice serves to pressurize the gases within the cavity and the resulting thermal expansion forces a jet out of the cavity. If a combustible mixture is contained within the cavity, the heat transfer will ignite this mixture, providing additional thermal expansion. Additionally, since the inner and outer electrodes are essentially parallel for a short distance, an electromagnetic force is developed which accelerates the plasma away out of the orifice. Thus, this plasma jet ignitor develops a jet both through thermal expansion and through electromagnetic acceleration. However, this device has an essentially continuously increasing plasma surface area and a continuously decreasing magnetic field strength. This results in a continuously decreasing electromagnetic force available to accelerate the plasma. Further, because the electrodes are exposed to each other for only a very short length, the plasma is weakly accelerated from zero velocity for only a very short period of time. Thus, the resulting electromagnetic pressure has been shown to be negligible, and the device achieves an ignition jet primarily through thermal expansion of the gases in the cavity and the jet mixture is relatively cool. The jet velocity is much less than the velocity of sound and the jet temperature and velocity decline as the jet expands.

The plasma jet ignitors discussed above attempt to solve the problems encountered in developing lean-burn engines. U.S. Pat. Nos. 4,203,393 and 4,398,526 recognize that ignition system difficulties may be important for other engine applications. These patents refer to use of plasma jet ignitors similar to that disclosed in U.S. Pat. No. 4,041,922 as applied to direct injection stratified charge spark ignition engines and spark assisted diesels, respectively. In fact, ignition system problems may affect or limit the design of most types of engines and continuous combustion systems.

For conventional spark ignition engines, an increased rate of combustion is advantageous for increasing thermal efficiency, fuel economy, and performance. A high velocity jet of reactive species would serve to decrease the duration of combustion. Cyclic variability, knock tendency, and fuel sensitivity should also decrease. As a second example, achieving cold start of diesel engines is a significant ignition related problem. The ability to produce a high energy plasma jet that can penetrate across the combustion chamber without the need to have a combustible mixture in a cavity or spark initiation gap would result in the ability to force ignition rather than relying on autoignition. Such a device could be used to replace glow plugs in indirect injection diesels or as a cold starting aid for direct injection diesels, either in-cylinder or as the ignitor for a fuelburning manifold heater.

As another example, the assurance of achieving high altitude relight of aircraft gas turbines is an ignition problem. The ability to produce a high energy plasma jet that can penetrate across the combustion chamber without the need to have a combustible mixture in a cavity or spark initiation gap would be very advantageous for this application.

As another example, 2-stroke spark ignition engines normally misfire on as many as 30% of the engine's cycles at part load, obviously another ignition related problem. As yet another example, methanol fueled spark ignition engines need a high heat range spark plug for cold starting but a lower heat range spark plug for normal operation to avoid preignition off the hot spark plug. Similarly, dual-fuel spark ignition engines (spark ignition engines designed to be operated on gasoline, alcohol, or any blend such as M85-85% methanol and 15% gasoline) must use a spark plug that is three heat ranges lower when using methanol than when using gasoline, to avoid preignition off the hot spark plug. However, lower heat range spark plugs exhibit severe cold fouling problems when gasoline is being used. What is needed is a "cold" plug that resists fouling but delivers sufficient energy to ignite the mixture under adverse conditions.

There are various ways of powering a plasma jet ignitor, the most popular being either a SCR capacitor discharger or a thyrathron tube, each having a power supply booster circuit. The boosted injector power source can deliver up to 10 Joules per pulse to the injector, which is then selectively channeled to the appropriate plasma jet ignitors.

The design of both the power source and the plasma jet ignitor geometry also demand particular attention. In order to achieve optimal penetration of the jet, it is important that the power source optimize the energy delivered to the injectors while maintaining optimal pulse duration, and also that the point of injection be optimally focused near the center of the combustion chamber. Conventional plasma jet ignitors are limited to only 2 to 3 cm penetration which has proved unsuitable to allow lean-burn engines to achieve sufficiently lean operation for improved fuel economy and decreased emissions.

SUMMARY OF THE INVENTION

The present invention remedies the inherent limitations of prior plasma jet ignitors by utilizing a plasma injector capable of optimizing the plasma jet characteristics to optimize ignition within a combustion chamber. The invention develops a high energy plasma which produces a very high velocity plasma jet which can penetrate sufficiently far into a combustion chamber and which can be focused or spread according to a desired application. A suitable power source for this new type of ignitor is also presented.

There are several properties that are desirable in an ideal plasma injection system. For example, a large mass of plasma should be created. Since a plasma is only developed in the mixture through which the arc passes, it is desirable to have the arc move through the mixture so as to ionize a much larger volume of gas than is possible with prior plasma jet ignitors, in which the arc jumps only from one electrode to the other but does not sweep through the gases. Second, the plasma jet should have a high velocity. The higher the velocity, the greater the jet penetration and the greater the induced turbulence. These combine to decrease the duration of combustion and minimize flame extinction due to mid-cylinder flame quench. Thus, supersonic jet injection velocities are desired and such velocities cannot be attained via thermal expansion alone. Because thermal expansion dominates the jet ejection forces of the prior art described above, these prior plasma jet ignitors will not achieve the high velocity of the present invention. Additionally, the orifice configurations used in the prior art should be avoided because an orifice increases heat losses, introduces pressure losses, and decreases thermal efficiency. Also, it may be desirable to focus the plasma at some point in the combustion chamber and most often near the center of the combustion chamber. In this region, the air and fuel are well mixed and away from the cold chamber walls with their associative quenching effects. Further, this will decrease the duration of combustion. In addition, the plasma injection system should be durable.

The miniaturized railgun ignitor, or railplug, of the present invention operates on the principle of electromagnetics. Electromagnetic forces may be as much as 100 times larger than thermal expansion forces for a properly designed plasma injection system. By supplying current to electrodes or rails, current flowing in the rails creates an electromagnetic field in the railplug bore. The interaction of this field with the plasma current creates a JxB electromagnetic force (Lorentz force) which accelerates the arc down the railplug bore and projects it into the combustion chamber. Since the arc sweeps through the entire volume of the railplug bore, a much larger mass of plasma will be generated having higher energy than conventional plasma jet ignitors. The electromagnetic accelerating force causes the plasma to propagate down the railplug bore to achieve supersonic speeds at the muzzle exit. Depending upon the magnitude of the current and the bore dimensions, plasma propagation velocities between Mach 1.2 and Mach 10 can be achieved. Because thermal expansion augments but does not dominate the jet ejection forces, an orifice, found on conventional plasma jet ignitors, is neither required nor desired. Thus, a cavity need not be defined by the placement of an orifice on the combustion chamber side of the ignitor.

The present invention achieves the performance of an ideal ignitor through use of a novel configuration. In order to increase the plasma jet ejection velocity and thereby increase penetration depth and induce turbulence, the present invention has a large ratio of bore length to electrode spacing, or aspect ratio. By increasing this aspect ratio, the present invention can achieve supersonic jet ejection velocities, extend penetration depth to an optimum point in the combustion chamber, and induce more turbulence in the combustion chamber. An aspect ratio of at least 3:1 is desirable and at least about 6:1 is preferred. An aspect ratio of at least 10:1 is useful in some application. If a smaller chamber is encountered, the aspect ratio can easily be reduced to maintain optimum ignition. Also, in order to control the focus of the plasma exiting the railplug bore, the present invention can use a coaxial bore configuration. The coaxial bore has an outer and inner electrode pair, the inner electrode being axially positioned so that the inner electrode is longer than, shorter than, or the same length as the outer annular electrode. If the inner electrode is up to one bore diameter shorter than the outer electrode, the plasma jet is focused and the plasma jet's tendency to immediately spread (due to thermodynamic effects) in a conical pattern is minimized. If the combustion chamber is fairly small, the inner electrode can be extended beyond the end of the outer electrode to enhance plasma hemispherical spreading. Thus, the aspect ratio and electrode configuration can be adjusted to maintain optimum ignition for various sizes of combustion chambers.

A square, rectangular, or round bore railplug configuration can also function to focus the plasma jet by decreasing the electrode spacing from t he region of plasma initiation end to the muzzle end. By converging the electrodes such that the electrode spacing at the muzzle end is smaller than the spacing at the plasma-initiation end of the railplug, a more focused jet discharge pattern can be maintained deeper into the combustion chamber. Conversely, if a shallow penetration depth is desired, the electrodes can be situated in a diverging pattern such that the muzzle end is of larger dimension than the plasma-initiation end. By extending or retracting the inner electrode of a coaxial configuration, or by converging or diverging the electrodes of a square, rectangular, or round bore configuration, the plasma jet and its corresponding penetration depth can be adjusted to accommodate varying sizes and shapes of combustion chambers.

If desired, spin can be imparted to the plasma jet according to the present invention, by properly configuring the electrodes of the railplug, or by applying an external magnetic field to the railplug. More specifically, a coaxially configured railplug with the outer electrode having a helical shape, or a railplug with the electrodes forming a double helix, will impart spin to the exiting plasma jet. An energized solenoid surrounding the railplug will also impart spin to the exiting plasma jet.

The railplug of the present invention is also more durable than known spark ignition devices because the arc does not dwell long in a single place on the electrodes. Durability can also be improved by coating portions of the electrodes with refractory, precious and/or noble metals, and by ramping the supply currents from a low to a high value.

So as to maintain the optimal jet ejection velocity, optimal jet shape, and optimal penetration depth, the present invention preferably uses an improved high energy power supply which ramps the current up from about 100 mA to initiate the plasma and which emits a peak current on the order of 1kA. By increasing the current, the JxB electromagnetic force is boosted such that the plasma jet is propelled at a velocity of 1 to 2 km/s or greater. Increased velocity will allow deeper plasma penetration before ignition occurs in the combustion chamber and will induce more turbulence in the combustion chamber. The improved power supply comprises a compulsator driven by an internal combustion engine crankshaft. The compulsator or compensated pulsed alternator, such as that disclosed in U.S. Pat. No. 4,200,831, the disclosure of which is incorporated herein by reference, includes a dedicated electromechanical generator which directly drives the railplugs with no high voltage switching as in conventional ignition system design.

Further objects, features, and advantages of the present invention will be apparent from the following detailed description when taken in conjunction with the accompanying drawings.

DESCRIPTION OF THE PREFERRED EMBODIMENT

Figure 1:
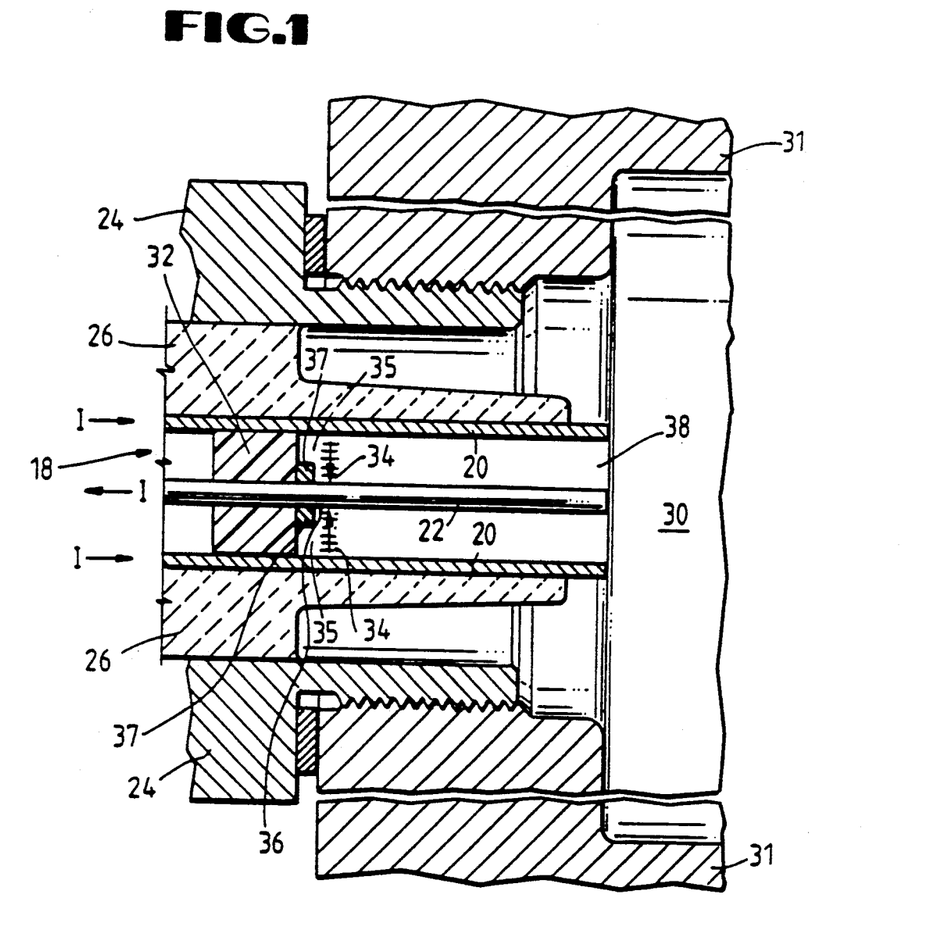
FIG. 1 is a cross-sectional view of a coaxial-electrode railplug according to the present invention.

FIG. 1 is a cross-sectional view of coaxial-bore railplug 18 of the present invention. Coaxial-bore railplug 18 comprises outer electrode 20 and inner electrode 22 placed substantially parallel to one another. Outer electrode 20 is substantially cylindrical in shape and centered around a central axis traversing inner electrode 22. Outer and inner electrode 20 and 22, respectively, of railplug 18 are contained within holding plug 24 and surrounded by insulating sleeve 26. Sleeve 26 is substantially cylindrical in shape and electrically isolates outer electrode 20 from holding plug 24. Railplug 18, contained within holding plug 24, is designed to be inserted into combustion chamber 30. Like a standard spark plug, holding plug 24 can be threaded into cylinder head 31. Other suitable mechanical connections can also be used. Once in place, holding plug 24 provides an interface between railplug 18 and combustion chamber 30. Combustion chamber 30 can be any chamber in which a combustible mixture or medium resides, and for which ignition of that mixture or medium can take place. Combustion chamber 30 can be either an internal combustion engine or a continuous combustion system. The combustible mixture or medium can be, for example, an air-fuel mixture, a lean-fuel mixture, a solid or liquid propellant, or any other combustible material or mixture of materials.

Figure 2:
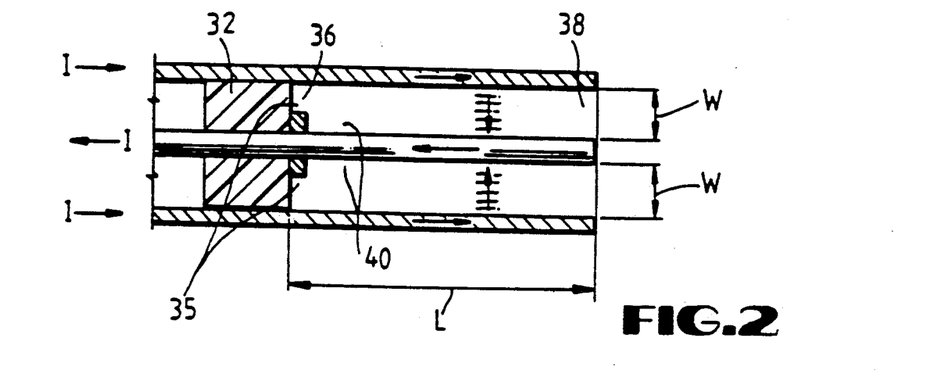
FIG. 2 is a cross-sectional view of plasma acceleration along the coaxial electrode railplug of FIG. 1.

Contained between the inner electrode 22 and outer electrode 20 is an insulating ring 32 which maintains spacing between inner and outer electrodes 22 and 20. Ring 32 is made of rigid, non-conductive material having inner and outer surfaces to which a portion of inner and outer electrodes 22 and 20, respectively, are connected. In order to establish an electromagnetic field, a current path I is shown in FIG. 1 as entering outer electrode 20 and exiting inner electrode 22. A pulsed current source (not shown in FIG. 1) is coupled to railplug 18 and provides the necessary current. In order to complete the current path, arc 34 forms between outer and inner electrodes 20 and 22. During each current pulse cycle, arc 34 begins at initiation end 36 and travels towards muzzle end 38 of railplug 18, as shown in FIG. 2.

Plasma initiation gap 35 is formed at plasma initiation end 36 of railplug 18 between conductive protrusions 37 and outer electrode 20. Protrusions 37 are formed integrally with or conductively coupled to inner electrode 22. Other structures for plasma initiation gap 35 are also acceptable as long as they function to ensure arc initiation at initiation end 36.

Because railplug 18 distributes electrical energy over a large surface area and because arc 34 accelerates down the inner and outer electrodes leaving little time available for electrode erosion, railplugs 18 should not exhibit electrode erosion except near initiation end 36. Low currents can be used to initiate arc 34 to minimize electrode erosion. Following the establishment of the arc using low current, the current can be ramped up to higher levels to accelerate the arc since there is little time or driving force for electrode erosion as the arc accelerates down the rails. Further, both outer and inner electrodes 20 and 22 can be coated with or made from a noble, precious, or refractory metal extending a length of approximately 1-10 bore diameters from the plasma initiation end 36. Acceptable metals for this purpose include, for example, platinum, rhodium, tungsten, and molybdenum. The spacing W between outer electrode 20 and inner electrode 22 is equal to the radial thickness of ring 32 and approximately equal to the radius of bore 40 through which arc 34 is accelerated from initiation end 36 to muzzle end 38 of bore 40. The plasma is accelerated by electromagnetic force created by pulsed current flowing through outer and inner electrodes 20 and 22, respectively. The resulting plasma jet is generally unidirectional as it travels down the length of bore 24 and is injected from muzzle end 38 into combustion chamber 30. As shown in FIG. 2, arc 34 travels down the length of bore 40 toward muzzle end 38, ionizing essentially all of the gas in the muzzle. Contained within combustion chamber 30 is a mixture of air and fuel, which ignites upon injection of the high energy plasma. The plasma entering combustion chamber 30 reaches muzzle exit velocities that are greater than the speed of sound and certainly greater than the velocity that can be achieved by thermal expansion alone.

Figure 3:
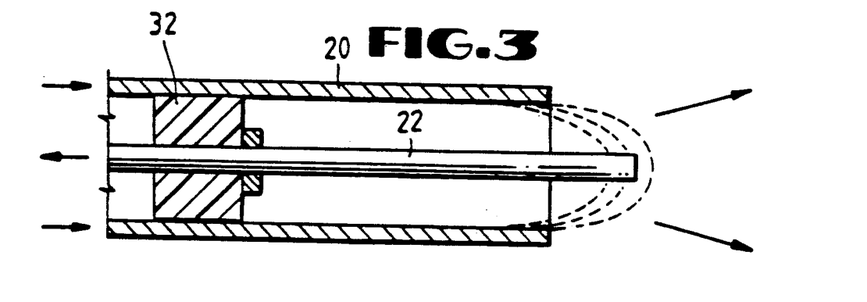
FIG. 3 is a cross-sectional view of a coaxial electrode railplug with a long inner electrode alternative embodiment.
Figure 4:
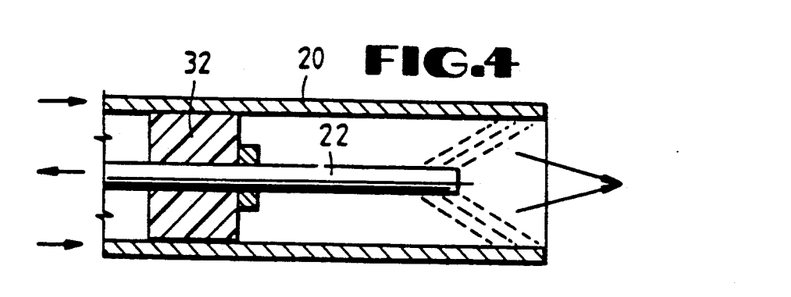
FIG. 4 is a cross-sectional view of a coaxial electrode railplug with a short inner electrode alternative embodiment.

The penetration depth of the plasma as it extends from muzzle end 38 and into combustion chamber 30, is controlled by several factors. First, by increasing length L of bore 24 in proportion to spacing W between electrodes 20 and 22, the plasma jet velocity can be increased which will increase penetration and induce more turbulence with chamber 30. According to the present invention, the aspect ratio, which is defined herein as the ratio of bore length L to electrode spacing W, is at least 3:1, and is preferably on the order of at least 6:1. Aspect ratios of at least 10:1 have also proven useful in certain applications. By regulating bore 40 geometry (either borelength L or electrode spacing W), plasma can be directed to a point near the middle of combustion chamber 30. A shallow penetration of plasma can occur by extending muzzle end 38 of inner electrode 22 as shown in FIG. 3. Conversely, a deeper penetration depth is achieved by retracting muzzle end 38 of inner electrode 22 as shown in FIG. 4. If plasma jet dispersion is desirable for a given combustion chamber 30, railplug 18 can be modified such that inner electrode 22 is extended beyond muzzle end 38 of outer electrode 20. By extending inner electrode 22 beyond muzzle end 38, plasma will have a tendency immediately to spread at the point at which it exits muzzle end 38. Thus, the spreading plasma of extended inner electrode 22 shown in FIG. 3 will spread more rapidly within chamber 30 than if the shorter inner electrode 22 of FIG. 4 is used. If a shorter inner electrode 22 is used, then the plasma is directed inward, thereby allowing a deeper penetration of a focused plasma before plasma dispersion occurs within chamber 30.

Figure 5:
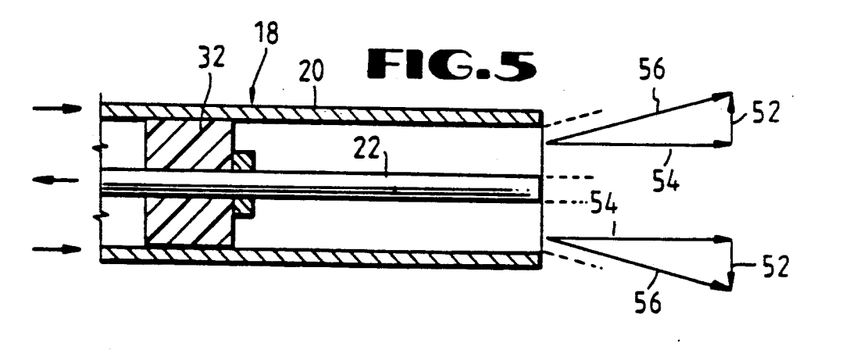
FIG. 5 is a cross-sectional view of plasma being propelled from the muzzle and of the coaxial electrode railplug of FIG. 1.

FIG. 5 illustrates inner electrode 22 extending flush with outer electrode 20. This results in an intermediate depth of plasma jet penetration between those shown in FIGS. 3 and 4. By setting inner electrode length 22 to be flush with outer electrode 20, the plasma jet will optimally penetrate to an intermediate depth necessary to accommodate combustion chamber 30 of intermediate dimensions. As is readily apparent from FIGS. 3, 4 and 5, inner electrode 22 can be designed such that its length is extended or retracted to accommodate combustion chambers 30 of different dimensions, geometries or shapes, so as to produce the desired optimal effects of the plasma jet. Inner electrode 22 is preferably lengthened or shortened by a distance of up to one bore diameter from the established bore length L.

One of the various ways in which forced ignition is achieved, is to direct or focus the plasma jet exiting muzzle end 38. FIG. 5 also illustrates three velocity vectors attributable to the exiting plasma jet stream. Directed (kinetic) velocity vector 54 is shown as extending along the central axis of railplug 18. Directed velocity 54 is the velocity vector of the plasma caused solely by electromagnetic force within railplug 18. However, random (thermal) velocity 52 is caused by natural thermal expansion of the plasma as it exits muzzle end 38. If the exiting plasma is directed by thermal expansion forces, more so than by electromagnetic forces, then resultant velocity 56 would be at a more severe angle from the central axis causing a more immediate spread of exiting plasma. However, even if a combustible mixture is ignited within railplug 18, the electromagnetic forces occurring in the railplug of the present invention will still dominate the thermal ejection forces. Therefore, random velocity 52 is small in comparison to directed velocity 54. Resultant velocity vector 56 is therefore focused more toward the center of combustion chamber 30 than ignitors that use a combination of both thermal expansion force and electromagnetic force.

Figure 6:
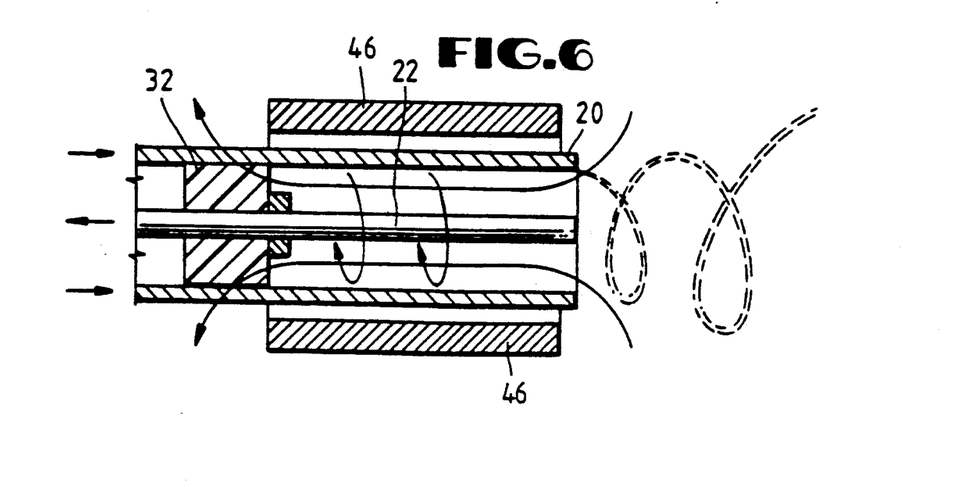
FIG. 6 is a cross-sectional view of a coaxial electrode railplug with an additional solenoidal electromagnet according to the present invention.

A spinning motion can be added to the exiting plasma by varying the configuration of railplug 18. FIG. 6 illustrates a cross-sectional side view of one such variation, wherein a solenoidal electromagnet 46 surrounds outer electrode 20. Solenoidal electromagnet 46 receives current in series with outer electrode 20 such that an additional electromagnetic field is exerted upon the plasma. By imparting a spin to the exiting plasma, a more efficient ignition can be achieved which minimizes quenching effects associated with cold combustion chamber 30 walls. Thus, one of the advantages in adding turbulence to the contents of combustion chamber 30 by spinning the plasma is to aid ignition and thereby allowing ignition at colder operating temperatures.

Figure 7:
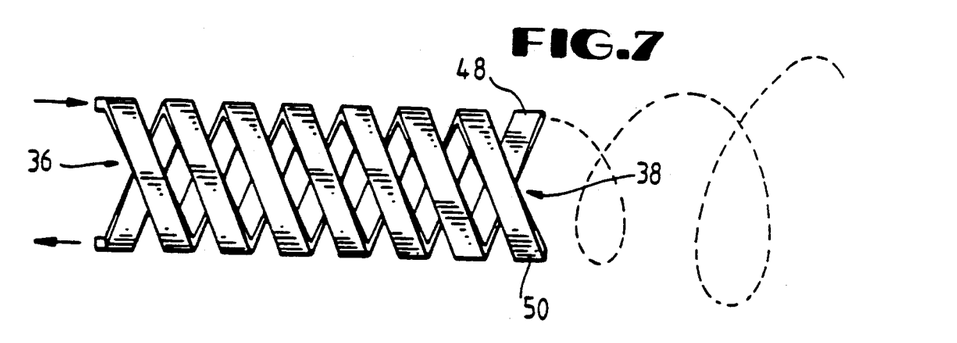
FIG. 7 is a perspective side view of a helical electrode railplug according to the present invention.

Plasma spin can also be achieved by the helical rail configuration shown in FIG. 7. Instead of bore 40 being coaxial, the helical configuration has a substantially cylindrical bore defined by a pair of helically arranged electrodes 48 and 50. Electrodes 48 and 50 are connected to a pulsed power supply and are electrically isolated from each other. Plasma accelerates between electrodes 48 and 50 from initiation end 36 to muzzle end 38. As the plasma moves between the electrodes, it forms a swirling or spiral path which extends beyond the muzzle end 38 and into combustion chamber 30.

Plasma spin also results in a railplug having a coaxial configuration with a straight inner electrode and a helical outer electrode.

Although turbulence aids ignition in certain types of engines, such as diesels, it is not necessary that the present invention induce turbulence in order to achieve its desired result. Railplug 18 can induce ignition without turbulence. Based solely on electromagnetic force, ignition can be achieved in adverse environments and prove useful as replacement for glow plugs in indirect injection diesel engines, conventional ignitors in gas turbines, and so forth. Diesel engines having high compression ratios of 21:1 to 23:1 are used to provide sufficient hot air at the end of the compression process to allow auto ignition of the fuel/air mixture. However, even these high compression ratios are insufficient to provide cold start when temperatures drop below zero to 10° C. Glow plugs are used to allow starting at colder temperatures, but are effective down to only about −5° to −15° C. The present invention replaces glow plugs with railplugs 18 that force ignition at temperatures below −15° C. Unlike conventional diesel engines using glow plugs, once the railplug 18 of the present invention starts the diesel engine, very little smoke and carbon monoxide are admitted into the environment during cold starts.

Figure 8:
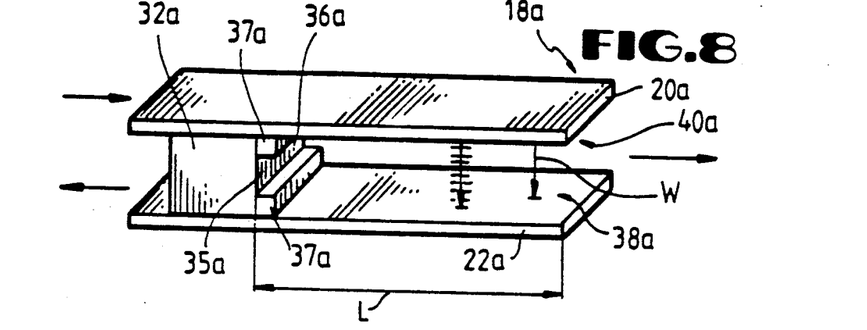
FIG. 8 is a perspective side view of a substantially parallel electrode railplug alternative embodiment plasma injector according to the present invention.

FIG. 8 is an alternative embodiment of the present invention having a dual-rail railplug 18a. Dual-rail railplug 18a comprises a pair of substantially parallel electrodes 20a and 22a. The spacing W between the pair of electrodes 20a and 22a defines initiation gap 35a formed by provision 37a at bore 40a through which plasma is accelerated from initiation end 36a to the muzzle end 38a. The plasma jet is accelerated unidirectionally down bore 40a by an electromagnetic force created by pulsed current conductively coupled to the electrode pair 20a and 22a. The plasma jet is accelerated from initiation gap 35a, i.e. at plasma initiation end 36a, and accelerates down bore 40a until the plasma partially detaches from muzzle end 38a and initiates combustion. The widths of electrodes 20a and 22a are preferably equal to bore width W. Once again, according to the present invention, the aspect ratio (ratio of bore length L to bore width W) is at least 3:1 and is preferably on the order of about 6:1. A ratio of at least 10:1 can also be effective in certain applications.

Figure 9:
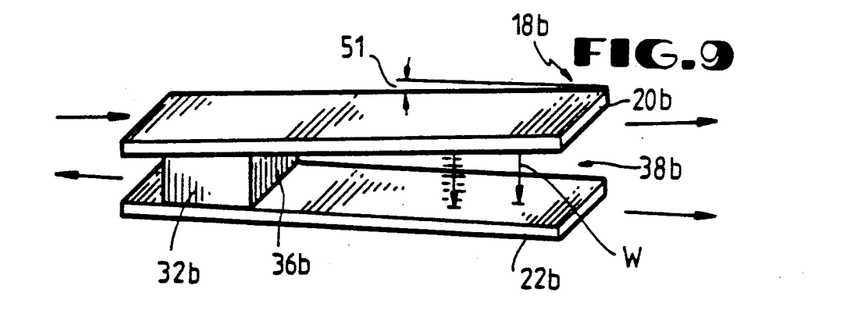
FIG. 9 is a perspective side view of a diverging electrode railplug alternative embodiment according to the present invention.

FIG. 9 is a cross-sectional view of another alternative embodiment dual-rail plasma ignitor 18b having diverging electrodes 20b and 22b. Electrodes 20b and 22b diverge outward from initiation end 36b to muzzle end 38b. The spacing W, between electrodes 20b and 22b at muzzle end 38b is larger than the muzzle end 38a of parallel electrodes 20a and 22a illustrated in FIG. 8. The larger muzzle dimension allows exiting plasma to exit in a diverging pattern, resulting in a decrease in penetration depth to accommodate a smaller combustion chambers. The magnitude of outward angle 51 can be varied and is preferably 0.5 to 10 degrees. Diverging electrodes 20b, 22b also eliminate the need for protrusions at plasma initiation end 36b. If the outward angle 51 is increased, the width W of muzzle end 28 will be increased, resulting in a less focused, and shallower plasma penetration depth. Once again, the aspect ratio of ignitor 18b is at least 3:1 and is preferably on the order of at least 6:1 or at least 10:1.

Figure 10:
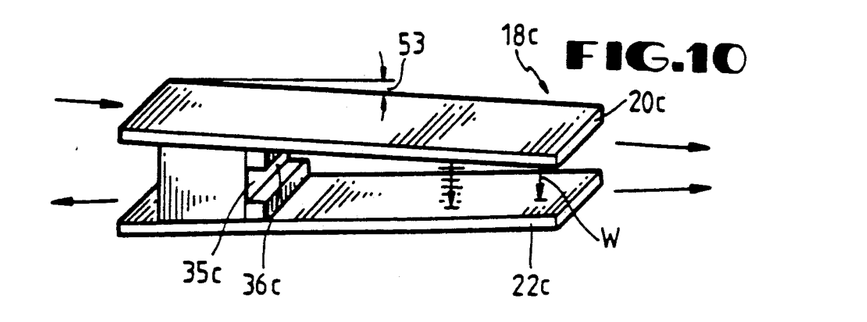
FIG. 10 is a cross-sectional view of a converging electrode railplug alternative embodiment according to the present invention.

FIG. 10 illustrates a cross-sectional view of another alternative embodiment dual-rail plasma ignitor 18c having converging, substantially rectangular electrodes 20c and 22c. The electrodes 20c and 22c converge inward from initiation gap 35c at initiation end 36c to muzzle end 38c. The spacing W between electrodes 20c and 22c at muzzle end 38c is smaller than that of parallel electrodes 20a and 22a at the muzzle end 38a illustrated in FIG. 8. The smaller exit dimension allows exiting plasma to focus inward, resulting in an increase in penetration depth to accommodate larger combustion chambers. The magnitude of inward angle 53 can be varied and is preferably 0.5 to 10 degrees. If inward angle 53 is increased, the width W of muzzle end 38c will be reduced, resulting in more focused and deeper plasma penetration depth. Aspect ratio remains at least 3:1 and preferably on the order at least of 6:1 or 10:1.

The coaxial railplug configurations of FIGS. 1-6, and the helical electrode configuration of FIG. 7 can also be modified to incorporate converging or diverging electrodes with plasma focusing or spreading effects.

Another way of controlling the plasma penetration depth is to increase the plasma acceleration force throughout the length of bore 40. Increasing the plasma force will result in an increased plasma velocity, thereby extending the plasma penetration depth into combustion chamber 30. One means for increasing the plasma acceleration force is by increasing the output of an applied current or voltage supply 42.

Figure 11:
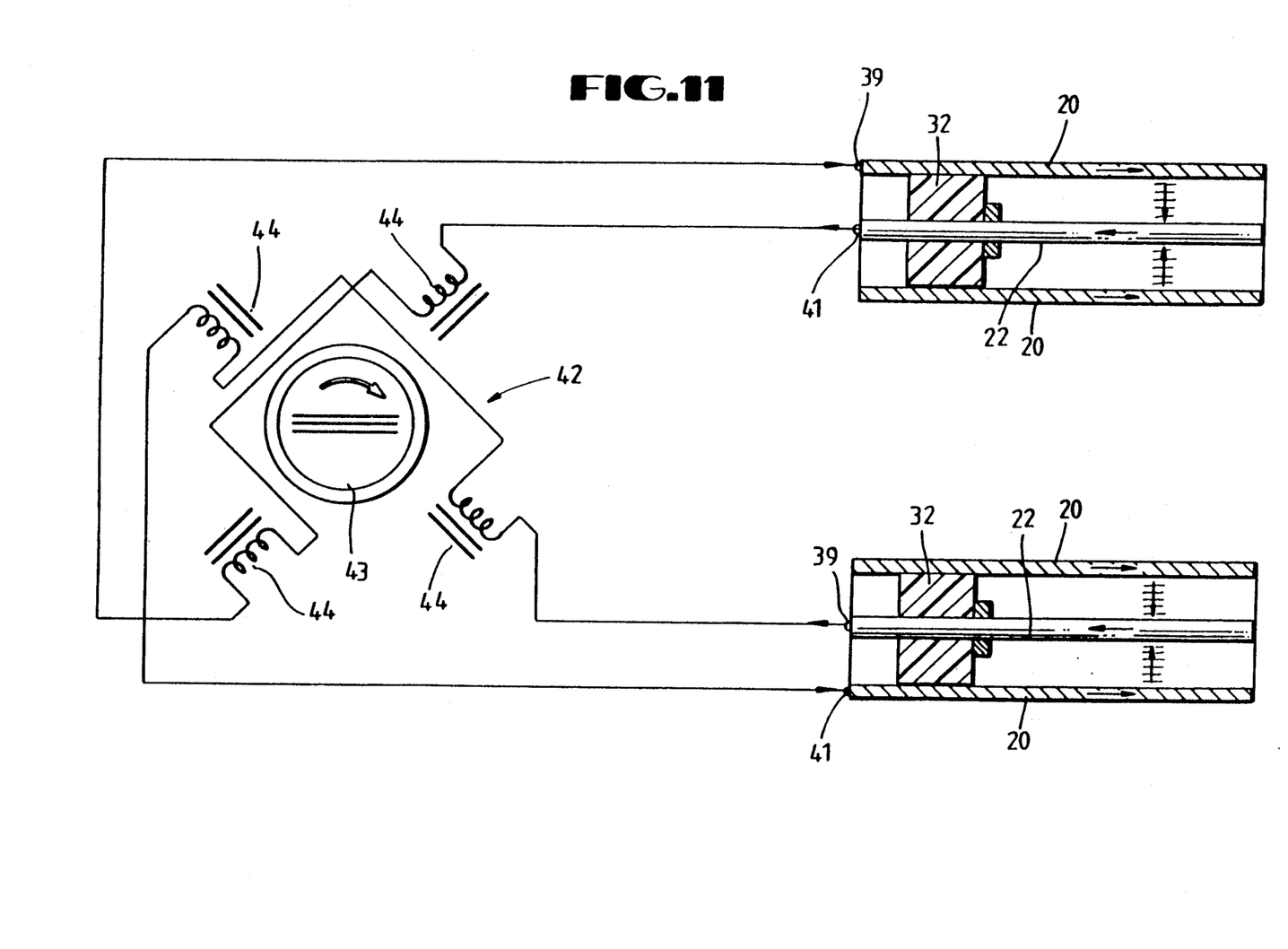
FIG. 11 is a high energy power supply illustrating a two-cylinder engine embodiment of the present invention.

The present invention includes a high energy power supply 42 shown in FIG. 11 which can apply a small current to initiate the plasma and then ramp up to a larger peak current pulse between inner and outer electrodes 22 and 20, respectively. Higher electrode currents translate to an increase in JxB or electromagnetic force used to drive the plasma down bore 24 and into combustion chamber 30. Pole pairs 44 of the high energy power supply 40 are attached to inner and outer electrodes 22 and 20 at a point removed from bore region 40 at points 39 and 41, which are separated by insulating ring 32. FIG. 11 shows high energy power supply 42 for a two-cylinder embodiment. The high energy supply 42 includes a compensated pulsed alternator or compulsator 40 driven directly from a standard internal combustion engine crankshaft. Indirect driving would also be acceptable. Illustrated is a two-pole electromagnetic or permanent magnetic rotor 43 operating in a multiple pole stator to directly drive railplugs 18 for a multi-cylinder engine with no high-voltage switching. The number of pole pairs is equal to the number of railplugs 18 used. Railplugs 18 of the present invention can require peak current on the order of 1,000 amperes.

The present invention provides easier ignition under adverse conditions, such as fuel-lean mixtures, low mixture temperatures, and low mixture densities. Via the various designs of the railplug and/or by increasing the electromagnetic forces applied to plasma within bore 40, the present invention is capable of increasing plasma penetration away from the quenching, cold combustion chamber 30 side walls. Not only does this promote ignition, but for certain applications, such as the homogeneous charge spark ignition engine, it decreases the duration of combustion and thus provide higher thermal efficiency, while for other applications for which the fuel and oxidant are admitted separately, such as diesels and gas turbines, the ability to fire a plasma across the combustion chamber allows ignition even when there is not a combustible mixture in the immediate vicinity of the ignitor. For still other applications, such as the 2-stroke and the lean-burn 4-stroke spark ignition engines, the high energy of the plasma together with the fact the ignition is moved away from the cold walls enhances ignition. The high energy of the plasma proves advantageous for even other applications, such as when used an ignitor for solid propellants. Further, the turbulence induced by the high velocity of the plasma jet generated by railplugs 18 is advantageous. For example, for the homogeneous charge spark ignition engine, the increased turbulence increases the rate of combustion and thus further increases the thermal efficiency of the engine while also decreasing the knock tendency and fuel sensitivity of the engine. As another example, for diesels and direct injection spark engines, the increased turbulence aids atomization of the fuel and/or increase the mixing of the fuel and oxidant and thus further enhances ignition. Further, the railplugs can be designed (either through mechanical configuration or by addition of a cooling jacket) to maintain a relatively low temperature although it produces a hot ignition. This would be advantageous for alcohol-fueled spark ignition engines. This fact, together with the fact the high temperature of the plasma will self-clean the rails, will overcome present ignitor problems of dual-fueled spark ignition engines. Therefore, replacement of present ignition systems with railplug systems will result in improved engine performance without the need to alter any of the other mechanical components. However, in order to take maximum advantage of the railplug system, engines may require redesign as far as location and orientation of the railplugs relative to placement of the conventional ignitors. Further, the availability of the railplug system will allow development of engines that currently are obstructed by ignition-related problems, such as the lean-burn spark ignition engine and the dual-fuel spark ignition engine.

In comparison to prior ignitors, railplugs are dominated by electromagnetic forces and the arc sweeps through a large volume. The high electromagnetic force is produce by use of a high aspect ratio, and essentially constant plasma surface area throughout the travel of the arc through the muzzle, and, preferably, an increasing current as the arc accelerates along the rails. An orifice separating the ignitor from the combustion chamber is neither required nor desired. Thus, railplugs produce a larger mass of plasma and a higher plasma velocity, resulting in a higher energy plasma, greater plasma penetration, and greater inducement of turbulence. Further, the unique design of the railplugs overcomes the durability problems associated with prior art ignitors.

The present invention has been disclosed in connection with specific embodiments. However, it will be apparent to those skilled in the art that variations from the illustrated embodiments may be undertaken without departing from the spirit and scope of the invention. For example, any power supply capable of delivering pulsed signals may be used, including, but not limited to a power supply operating off on an automobile crankshaft. Additionally, any type of augmented rail structure that can provide spinning or turbulent plasma flow beyond the solenoidal electromagnet or helical rails may be used. Furthermore, the point in which railplug 18 enters combustion chamber 30 can be varied such that railplug 18 can enter a hole placed in substantially any wall section of combustion chamber 30. These and other variations will be apparent to those skilled in the art and are within the spirit and scope of the invention.

What is claimed is:

1. A railgun ignition device for generating and injecting a high energy plasma jet into a combustion chamber, comprising:

first and second spaced apart electrodes extending along a central axis and defining a bore having a muzzle end and a plasma initiation end, said bore having a width equal to a spacing between said first and second electrodes at said muzzle end and a length equal to a distance between said muzzle end and said plasma initiation end, an aspect ratio of said bore being at least 3:1, said first and second electrodes converging toward each other from said plasma initiation end to said muzzle end at an angle in the range of 0.5 to 10 degrees.

2. A railgun ignition device for generating and injecting a high energy plasma jet into a combustion chamber, comprising:

first and second spaced apart electrodes extending along a central axis and defining a bore having a muzzle end and a plasma initiation end, said bore having a width equal to a spacing between said first and second electrodes at said muzzle end and a length equal to a distance between said muzzle end and said plasma initiation end, an aspect ratio of said bore being at least 3:1, said first and second electrodes diverging away from each other from said plasma initiation end to said muzzle end at an angle in the range of 0.5 to 10 degrees.

3. A railgun ignition device for generating and injecting a high energy plasma jet into a combustion chamber, comprising:

first and second spaced apart electrodes extending along a central axis and defining a bore having a muzzle end and a plasma initiation end, said bore having a width equal to a spacing between said first and second electrodes at said muzzle end and a length equal to a distance between said muzzle end and said plasma initiation end, an aspect ratio of said bore being at least 3:1, said first and second electrodes being coaxial, said first electrode being an inner electrode and said second electrode being an outer electrode, a length of said inner electrode being substantially equal to a length of said outer electrode plus said bore width.

4. A railgun ignition device for generating and injecting a high energy plasma jet into a combustion chamber, comprising:

first and second spaced apart electrodes extending along a central axis and defining a bore having a muzzle end and a plasma initiation end, said bore having a width equal to a spacing between said first and second electrodes at said muzzle end and a length equal to a distance between said muzzle end and said plasma initiation end, an aspect ratio of said bore being at least 3:1, said first and second electrodes being coaxial, said first and second electrodes converging toward each other from said plasma initiation end to said muzzle end at an angle in the range of 0.5 to 10 degrees.

5. A railgun ignition device for generating and injecting a high energy plasma jet into a combustion chamber, comprising:

first and second spaced apart electrode extending along a central axis and defining a bore having a muzzle end and a plasma initiation end, said bore having a width equal to a spacing between said first and second electrodes at said muzzle end and a length equal to a distance between said muzzle end and said plasma initiation end, an aspect ratio of said bore being at least 3:1, said first and second electrodes being coaxial, said first and second electrodes diverging away from each other from said plasma initiation end to said muzzle end at an angle in the range of 0.5 to 10 degrees.

6. A combustion system comprising:

at least one combustion chamber;

at least one railplug connected to each combustion chamber, each railplug including:

first and second spaced apart electrodes extending along a central axis together defining a bore having a muzzle end, disposed within a respective combustion chamber, and a plasma initiation end, a length of said bore being equal to a distance between said muzzle end and said plasma initiation end and a width of said bore being equal to a spacing between said first and second electrodes at said muzzle end, an aspect ratio of said bore exceeding 3:1, and a pulse generator for supplying pulsed electrical energy to each railplug, said pulse generator comprising:

a high energy power supply, supplying low current to initiate a plasma at said plasma initiation end of each railplug and a peak current exceeding said low current; and a high energy switching means for selectively coupling current from said high energy power supply to each railplug at pulse intervals.

7. An internal combustion engine for rotating a crankshaft, comprising:

at least one combustion chamber;

at least one railplug connected to each combustion chamber, each railplug including:

first and second spaced apart electrodes extending along an axis and defining a bore, a ratio of a length of said bore to a distance between said electrodes being at least 3:1; and electromechanical plus generating means, driven by said crankshaft, for applying timed electrical energy pulses to said electrodes of each railplug, said electrochemical pulse generating means comprising a compulsator.

8. A continuous combustion engine comprising:

at least one continuous combustion chamber;

at least one railplug connected to each continuous combustion chamber, each railplug including:

first and second spaced apart electrodes extending along an axis and defining a bore, a ratio of a length of said bore to a distance between said electrodes being at least 3:1, and an electromechanical pulse generator for applying at least one electrical energy pulse to said electrodes of each railplug, said electromechanical pulse generator comprising a compulsator.

9. A railgun ignition device for generating and injecting a high energy plasma jet into a combustion chamber, comprising:

first and second spaced apart electrodes extending along a central axis and defining a bore having a muzzle end and a plasma initiation end, said bore having a width equal to a spacing between said first and second electrodes at said muzzle end and a length equal to a distance between said muzzle end and said plasma initiation end, an aspect ratio of said bore being at least 3:1, and electromagnetic means for spinning said plasma jet about said central axis.

10. The railgun ignition device of claim 9, said electromagnetic means comprising a solenoidal electromagnet.

11. A railgun ignition device for generating and injecting a high energy plasma jet into a combustion chamber, comprising:

a holding plug including means for mounting said railgun ignition device in a combustion chamber; and first and second spaced apart electrodes electrically insulated from said holding plug and extending along a central axis and defining a bore having a muzzle end and a plasma initiation end, said bore having a width equal to a spacing between said first and second electrodes at said muzzle end and a length equal to a distance between said muzzle end and said plasma initiation end, an aspect ratio of said bore being at least 3:1.

12. The railgun ignition device of claim 11, said pair of electrodes being coated with a metal extending for a distance of from 1 to 10 bore widths along said electrodes from said plasma initiation end, said metal being selected from the group consisting of refractory metal, noble metal and precious metal.

13. The railgun ignition device of claim 11, said first and second electrodes extending substantially parallel to each other along said central axis.

14. The railgun ignition device of claim 11, said aspect ratio being at least 6:1.

15. The railgun ignition device of claim 14, said aspect ratio being at least 10:1.

16. The railgun ignition device of claim 11, said first and second electrodes being coaxial.

17. The railgun ignition device of claim 16, said first and second electrodes extending substantially parallel to each other along said central axis.

18. The railgun ignition device of claim 16, said first and second electrodes being of different lengths.

19. The railgun ignition device of claim 18, said first electrode being an inner electrode and said second electrode being an outer electrode, said inner electrode being shorter than said outer electrode.

20. The railgun ignition device of claim 19, a length of said inner electrode being substantially equal to a length of said outer electrode less said bore width.

21. The railgun ignition device of claim 18, said first electrode being an inner electrode and said second electrode being an outer electrode, said inner electrode being longer than said outer electrode.

22. A combustion system comprising:
at least one combustion chamber;
at least one railplug connected to each combustion chamber, each railplug including:
a holding plug including means for connecting said railplug to a respective combustion chamber;
first and second spaced apart electrodes, electrically insulated from said holding plug and from said respective combustion chamber, and extending along a central axis together defining a bore having a muzzle end, disposed within said respective combustion chamber, and a plasma initiation end, a length of said bore being equal to a distance between said muzzle end and said plasma initiation end and a width of said bore being equal to a spacing between said first and second electrodes at said muzzle end, an aspect ratio of said bore exceeding 3:1, and
a pulse generator for supplying pulsed electrical energy to each railplug.

23. The combustion system of claim 22, said first and second electrodes being substantially parallel to each other.

24. The combustion system of claim 22, said first and second electrodes being coaxial.

25. The combustion system of claim 22, said aspect ratio being at least 6:1.

26. The combustion system of claim 25, said aspect ratio being at least 10:1.

27. An ignition device for generating and injecting a high energy plasma jet into a combustion chamber, comprising:
first and second spaced apart electrodes, at least one of said electrodes extending helically around a central axis, said electrodes defining a bore having a muzzle end and a plasma initiation end, a bore width being equal to a distance between said first and second spaced electrodes, and a bore length being equal to a distance between said muzzle end and said plasma initiation end of said bore, an aspect ratio of said bore being at least 3:1.

28. The ignition device of claim 27, said high energy plasma jet being injected from said initiation end to said muzzle end and into said combustion chamber with a spinning component.

29. The ignition device of claim 28, said distance between said first and second electrodes at said muzzle end being substantially equal to a distance between said first and second electrodes at said plasma initiation end.

30. The ignition device of claim 28, said distance between said first and second electrodes at said muzzle end being greater than a distance between said first and second electrodes at said plasma initiation end.

31. The ignition device of claim 28, said distance between said first and second electrodes at said muzzle end being less than a distance between said first and second electrodes at said at said plasma initiation end.

32. The ignition device of claim 28, said first and second electrodes together forming a double helix.

33. An internal combustion engine for rotating a crankshaft, comprising:
at least one combustion chamber;
at least one railplug connected to each combustion chamber, each railplug including:
a holding plug including means for connecting said railplug to a respective combustion chamber;
first and second spaced apart electrodes, electrically insulated from said holding plug and from said respective combustion chamber, and extending along an axis and defining a bore, a ratio of a length of said bore to a distance between said electrodes being at least 3:1; and
electromechanical pulse generating means, driven by said crankshaft, for applying timed electrical energy pulses to said electrodes of each railplug.

34. The internal combustion engine of claim 33, said ratio being at least 6:1.

35. The internal combustion engine of claim 33, said ratio being at least 10:1.

36. The internal combustion engine of claim 33, said first and second electrodes being coaxial.

37. A continuous combustion engine comprising:
at least one continuous combustion chamber;
at least one railplug connected to each continuous combustion chamber, each railplug including:
a holding plug including means for connecting said railplug to said continuous combustion chamber;
first and second spaced apart electrodes, electrically insulated from said holding plug and from said continuous combustion chamber, and extending along an axis and defining a bore, a ratio of a length of said bore to a distance between said electrodes being at least 3:1, and
an electromechanical pulse generator for applying at least one electrical energy pulse to said electrodes of each railplug.

38. The continuous combustion engine of claim 37, said ratio being at least 6:1.

39. The continuous combustion engine of claim 38, said ratio being at least 10:1.

40. The continuous combustion engine of claim 37, said first and second electrodes being coaxial.

* * * * *

UNITED STATES PATENT AND TRADEMARK OFFICE
CERTIFICATE OF CORRECTION

PATENT NO. : 5,076,223

DATED : December 31, 1991

INVENTOR(S) : Brian L. Harden, et al.

It is certified that error appears in the above-identified patent and that said Letters Patent is hereby corrected as shown below:

Column 14, claim 7, line 29, delete "electrochemical" and insert-- electromechanical--.

Signed and Sealed this

Fourth Day of May, 1993

Attest:

MICHAEL K. KIRK

Attesting Officer

Acting Commissioner of Patents and Trademarks